(12) United States Patent
Yuno et al.

(10) Patent No.: US 8,293,348 B2
(45) Date of Patent: Oct. 23, 2012

(54) MULTILAYERED LAMINATE FILM

(75) Inventors: Masato Yuno, Tokyo (JP); Kaoru Watanabe, Tokyo (JP); Norio Akita, Tokyo (JP); Shigeki Matsui, Tokyo (JP); Satoshi Oosone, Tokyo (JP); Kozo Mita, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 147 days.

(21) Appl. No.: 12/734,418

(22) PCT Filed: Oct. 29, 2008

(86) PCT No.: PCT/JP2008/069594
§ 371 (c)(1),
(2), (4) Date: Jul. 28, 2010

(87) PCT Pub. No.: WO2009/057615
PCT Pub. Date: May 7, 2009

(65) Prior Publication Data
US 2010/0296757 A1 Nov. 25, 2010

(51) Int. Cl.
*B29D 23/00* (2006.01)

(52) U.S. Cl. .................................... 428/35.7; 428/36.91

(58) Field of Classification Search .................. 428/216, 428/35.7; 220/200; 383/116
See application file for complete search history.

(56) References Cited

U.S. PATENT DOCUMENTS

| 6,849,313 | B2 * | 2/2005 | Mechelaere et al. | ......... 428/35.2 |
| 2002/0013415 | A1 * | 1/2002 | Mechelaere et al. | ......... 525/191 |

FOREIGN PATENT DOCUMENTS

| JP | 5-212835 | 8/1993 |
| JP | 6-328639 | 11/1994 |
| JP | 11-509575 | 8/1999 |
| JP | 2002-283513 | 10/2002 |
| JP | 2005-88283 | 4/2005 |
| JP | 2006-256636 | 9/2006 |
| JP | 2007-168255 | 7/2007 |
| JP | 2008-114437 | 5/2008 |

OTHER PUBLICATIONS

International Preliminary Report on Patentability including English translation of PCT Written Opinion issued Jun. 10, 2010 in International PCT Application No. PCT/JP2008/069594 of which the present application is the U.S. National Stage.
International Search Report issued Jan. 20, 2009 in International (PCT) Application No. PCT/JP2008/069594.

* cited by examiner

*Primary Examiner* — N. Edwards
(74) *Attorney, Agent, or Firm* — Wenderoth, Lind & Ponack, L.L.P.

(57) ABSTRACT

There is provided a multilayer laminate film with easy unsealability, heat resistance and easy cuttability, having a seal layer (A) and a base material layer (B), the multilayer laminate film containing the seal layer (A) and the base material layer (B) composed of a mixture of 10-50 parts by weight of high-density polyethylene and 50-90 parts by weight of polypropylene, laminated on the seal layer (A) in one layer or two or more layers,
wherein the base material layer (B) is composed of one member selected from the group consisting of (a) an ethylene/butene copolymer with a density of 0.93 g/cm$^3$-0.94 g/cm$^3$, polymerized using a multisite catalyst, (b) high-density polyethylene with a density of 0.945 g/cm$^3$-0.965 g/cm$^3$ and (c) an ethylene/propylene block or random copolymer,
further wherein the layer thickness of the seal layer (A) is 1 μm-20 μm while the layer thickness of the base material layer (B) is 20 μm-100 μm, as well as a packaging container and packaging bag employing it as a lid material.

21 Claims, 2 Drawing Sheets

MULTILAYERED LAMINATE FILM

TECHNICAL FIELD

The present invention relates to a multilayer laminate film used in the field of flexible packaging for packaging container lid materials or packaging bags intended primarily for foods, chemical products and the like, the multilayer laminate film exhibiting sufficient sealing property as well as excellent unsealability, having heat resistance capable of withstanding heat treatment including boiling treatment and retort treatment, being easily cuttable, and being free of impairment on appearance such as stringiness at the peeling sections, as well as to a packaging container and packaging bag that employ the film as a lid material.

BACKGROUND ART

In recent years, packaging containers and packaging bags have been required to exhibit sufficient sealing property for protection and storage of the contents, as well as easy unsealability (easy peelability) allowing them to be more easily opened by consumers. Various types of packaging films have been proposed that exhibit practical levels of both sealing property and easy unsealability.

For example, films that have been developed with the aim of providing easy unsealability include heat sealable laminated films composed of two layers that are blended layers of various acrylic acid copolymers and polyethylene (see Patent document 1), laminated films comprising 3-component blended layers of polybutene, polypropylene and polyethylene on a polypropylene base material layer (see Patent document 2), and multilayer films having a layer composed of a mixture of a methacrylic acid copolymer and polypropylene, and a polyethylene sealant layer (see Patent document 3).
[Patent document 1] Japanese Unexamined Patent Publication HEI No. 5-212835
[Patent document 2] Japanese Unexamined Patent Publication HEI No. 6-328639
[Patent document 3] Japanese Unexamined Patent Publication No. 2002-283513

DISCLOSURE OF THE INVENTION

Problems to be Solved by the Invention

Conventional films whose purpose is to provide easy unsealability, however, have high material cost and low freedom of selection for the film-forming conditions (blending conditions, for example), and also contain substances such as polybutene that lower the heat resistance in order to increase the low temperature sealability, and therefore exhibit stringiness at the peeling sections, which impairs the outer appearance.

Means for Solving the Problems

As a result of much diligent research directed toward solving the aforementioned problems, the present inventors have developed, as a multilayer laminate film exhibiting easy unsealability, heat resistance and easy cuttability, a multilayer laminate film having a seal layer (A) and a base material layer (B), characterized in that:

the seal layer (A) comprises a mixture of 10-50 parts by weight of high-density polyethylene and 50-90 parts by weight of polypropylene, the base material layer (B) comprises one member selected from the group consisting of (a) an ethylene/butene copolymer with a density of 0.93 $g/cm^3$-0.94 $g/cm^3$, polymerized using a multisite catalyst, (b) high-density polyethylene with a density of 0.945 $g/cm^3$-0.965 $g/cm^3$ and (c) an ethylene/propylene block or random copolymer, the base material layer (B) is laminated on the seal layer (A) in one or more Layers, and the layer thickness of the seal layer (A) is 1 μm-20 μm while the layer thickness of the base material layer (B) is 20 μm-100 μm. Also, by further laminating the multilayer laminate film with a packaging material selected from among a stretched film, barrier film and aluminum foil, a multilayer laminate film with an oxygen barrier property, a water vapor barrier property and an excellent aesthetic quality was obtained.

EFFECT OF THE INVENTION

Since the multilayer laminate film of the present invention has excellent heat resistance, a packaging container or packaging bag employing it can sufficiently withstand heat treatment conditions such as boiling or retort treatment. Such a packaging container or packaging bag, unlike conventional retort containers, also has a suitable degree of easy unsealability. Moreover, the relative lack of stringiness at the opening provides it with both excellent practicality and aesthetic quality.

The multilayer laminate film of the invention can be produced by any of various methods known to one skilled in the art, but it is preferably produced by an inflation film formation method which allows inexpensive production even with small lots. The inflation film formation method is suitable for multi-kind and small quantity production, but their range of applicability is narrow, rendering them useful only for certain types of materials. As the multilayer laminate film of the invention can be produced by such inflation film formation method, it is highly advantageous in terms of cost as well.

The seal layer (A) in the multilayer laminate film of the invention comprises non-compatible high-density polyethylene and polypropylene that adopt a sea-island structure formed of a sea component with a higher component ratio between these resins and an island component with a lower component ratio.

According to the invention, the MFR (melt-mass flow rate) of the resins may be controlled to adjust the sea-island structure, in order to achieve the desired cohesive peel strength. In addition, this type of structure allows the invention to reduce production costs compared to conventional easily unsealable films.

Furthermore, if a multilayer laminate film of the invention is laminated with a packaging material selected from among a stretched film, barrier film and aluminum foil on the outer surface of the base material layer (B) opposite the seal layer (A) side, an even more excellent gas barrier property can be imparted.

BEST MODE FOR CARRYING OUT THE INVENTION

The present invention will now be explained in greater detail.

The multilayer laminate film of the invention comprises a seal layer (A) and a base material layer (B) laminated thereover.

<1> Seal layer (A)

The names of the resins used in the invention are those commonly used in the industry. In the invention, the density was measured according to JIS K 7112.

(1) High-Density Polyethylene of Seal Layer (A)

According to the invention, polyethylene includes ethylene homopolymer and block or random copolymers of ethylene with other α-olefins (for example, propylene, 1-butene, 1-pentene, 1-hexene, 1-octene and the like).

The high-density polyethylene composing the seal layer (A) is a resin with a relatively high melt viscosity, having a density of 0.945-0.965 g/cm$^3$ and more preferably 0.950-0.955 g/cm$^3$ and a MFR (190° C.) of 1-7 g/10 min and more preferably 1-4 g/10 min. As a result, it is possible to prevent scuffing during peeling of the lid material, and thus ensure an aesthetic outer appearance after peeling.

If the density is less than 0.945 g/cm$^3$, there may be increased stringiness, while if it exceeds 0.965 g/cm$^3$, there may be more production of unmelted products during film formation, thus potentially impairing the outer appearance of the film.

If the MFR (190° C.) is less than 1 g/10 min, production will be hampered due to a reduced flow property while the compatibility with high MFR polypropylene will be poor, thus resulting in visible If it exceeds 7 g/10 min, its MFR will no longer differ from that of polypropylene, so that their interdispersibility will increase and the desired easy unsealability will not be obtained. The MFR (190° C.) was measured according to JIS K6922.

As examples of high-density polyethylene preferred for use in the invention, there may be mentioned HIZEX 3300F by Prime Polymer Co., Ltd., and NOVATEC HJ360 and HJ362N by Japan Polyethylene Corp.

(2) Polypropylene Composing Seal Layer (A)

According to the invention, polypropylene includes propylene homopolymer and block or random copolymers of propylene and other α-olefins.

The polypropylene composing the seal layer (A) may be a resin with a density of 0.9-0.91 g/cm$^3$ and a MFR (230° C.) of 5-30 g/10 min. Ethylene/propylene random copolymer is particularly preferred in order to obtain suitable seal strength. Block copolymers have high cohesive fracture strength and may not provide satisfactory easy unsealability.

If the MFR (230° C.) is less than 5 g/10 min, the flow property will approach that of high-density polyethylene which has a low MFR, creating a finely dispersed state and making it impossible to obtain a satisfactory level of easy unsealability. If the MFR (230° C.) exceeds 30 g/10 min, the high flow property will make it impossible to form the film by the inflation film formation. The MFR (230° C.) was measured according to JIS K6921.

Examples of suitable polypropylenes for use in the invention include ethylene/propylene random copolymer (J235T) by Prime Polymer Co., Ltd., and NOVATEC FL03H by Japan Polypropylene Corp.

(3) Blend Ratio

The blend ratio of high-density polyethylene and polypropylene in the seal layer (A) is preferably 10-50 parts by weight of high-density polyethylene and 50-90 parts by weight of polypropylene, although the blend ratio may be modified according to the required adhesive strength.

If the proportion of polypropylene is higher than the above range, the adhesive strength will be too high preventing satisfactory easy unsealability, while if the proportion is lower, the adhesive strength will not be sufficient and the sealing property of the packaging container or packaging bag will not be satisfactory.

<2> Base Material Layer (B)

The base material layer (B) in the multilayer laminate film of the invention must not only contribute to easy unsealability together with the seal layer (A), but must also have strength for the function of a packaging container lid material or packaging bag, heat resistance that can withstand heat treatment including boiling and retort treatment, and film-forming stability. As resins satisfying these requirements, there may be used (a) ethylene/butene copolymers with a density of 0.93 g/cm$^3$-0.94 g/cm$^3$, polymerized using a multisite catalyst, or (b) high-density polyethylene with a density of 0.945 g/cm$^3$-0.965 g/cm$^3$. Most preferably, their flexural modulus is a numerical value of 300 MPa or greater according to JIS K 7171.

As different resins satisfying the aforementioned requirements, there may be used (c) ethylene/propylene block or random copolymers. Such (c) resins are particularly preferred from the standpoint of cost.

If necessary, one or more base material layers (B) may be laminated.

As an example of an ethylene/butene copolymer with a density of 0.93 g/cm$^3$-0.94 g/cm$^3$ (a) polymerized using a multisite catalyst that is suitable for use in the invention, there may be mentioned the ethylene/butene copolymer NEOZEX 3510F Prime Polymer Co., Ltd.

As high-density polyethylene with a density of 0.945 g/cm$^3$-0.965 g/cm$^3$ (b) that is suitable for use in the invention, there may be mentioned the high-density polyethylene HIZEX 3300F by Prime Polymer Co., Ltd., the high-density polyethylene NOVATEC HJ360 by Japan Polyethylene Corp. and the high-density polyethylene NOVATEC HJ362N by Japan Polyethylene Corp.

As examples of ethylene/propylene block or random copolymers (c) that are suitable for use in the invention, there may be mentioned the ethylene/propylene block copolymers PF380A, PC540R and FX4E by SunAllomer, Ltd., and the ethylene/propylene block copolymer FW4BT by Japan Polypropylene Corp.

<3> Packaging Material

The surface of the base material layer (B) in the multilayer laminate film of the invention may be appropriately laminated with one layer or two or more layers of packaging materials, for example, stretched films, barrier films or metal films such as aluminum foils. For example, a multilayer laminate film of the invention laminated with the following packaging materials is preferred.

(i) A multilayer laminate film wherein a stretched film is laminated on the outer surface of the base material layer (B) opposite the seal layer (A) side, and then a barrier film is laminated thereover.

(ii) A multilayer laminate film wherein a barrier film is laminated on the outer surface of the base material layer (B) opposite the seal layer (A) side, and then a stretched film is laminated thereover.

(iii) A multilayer laminate film wherein a stretched film is laminated on the outer surface of the base material layer (B) opposite the seal layer (A) side, then an aluminum foil and further a stretched film are laminated thereover.

(iv) A multilayer laminate film wherein an aluminum foil is laminated on the outer surface of the base material layer (B) opposite the seal layer (A) side, and then one layer or two or more layers of a stretched film are laminated thereover.

According to the invention, the "stretched film" refers to a film composed of a polyester such as polyethylene terephthalate (PET), polybutylene terephthalate or 6-naphthalate, a polyamide such as nylon6 or nylon66, or polyvinyl chloride, polyvinyl alcohol or a polycarbonate. As especially preferred stretched films, there may be mentioned stretched films composed of polyesters (polyethylene terephthalate), polyamides (nylon6, nylon66, nylon6-66) and the like, which exhibit excellent transparency, mechanical strength and packaging suitability. By laminating different stretched films on the multilayer laminate film of the invention, it is possible to improve the physical strength of the film.

According to the invention, the "barrier film" refers to an alumina vapor deposition film, silica vapor deposition film or acrylic acid resin coating film.

Alumina vapor deposition films and silica vapor deposition films have barrier layers formed by vapor deposition of alumina or silica on one side of a PET or nylon film, and they exhibit excellent oxygen barrier properties and water vapor barrier properties.

Acrylic acid resin coating films have barrier layers formed by coating an acrylic acid-based resin on one side of a PET film, and they exhibit excellent oxygen barrier properties. Since the barrier layer is composed of a resin, the barrier layer is not ruptured even when the film is bent, and therefore the oxygen barrier performance is maintained. As an example of an acrylic acid resin coating film suitable for use in the invention, there may be mentioned BESELA by Kureha Corp.

The packaging materials as described above can be laminated by a dry lamination method, solventless lamination method, extrusion lamination method, co-extrusion lamination method or the like.

If desired, the outer surface of the base material layer (B) may be laminated with a heat-shrinkable stretched film to prevent sagging of the film after heat treatment. Stretched nylon films or vapor deposited stretched nylon films may be used as such heat-shrinkable stretched films. Such films contain hydrogen bonds and can, therefore, be more easily stretched during film formation than PET films conventionally used as stretched films, while heating them at above the glass transition point results in more strong shrinkability than PET films. The film therefore does not sag even after boiling treatment and retort treatment, so that an aesthetic outer appearance can be maintained. However, if the shrinkage factors of the nylon film in the MD (direction of flow of the film) and the TD (direction perpendicular to the direction of flow) after heating for 5 minutes in hot water at 100° C. are less than 0.5%, the film will undergo sagging due to internal pressure after boiling treatment, while if the MD and TD shrinkage factors are larger than 4.0%, shrinkage will cause rupture of the vapor deposition barrier layer, making it impossible to exhibit sufficient oxygen and water vapor barrier properties.

As examples of suitable "stretched nylon films" for use in the invention, there may be mentioned HARDEN N1130, N1102 and N1200 by Toyobo, Ltd., and EMBLEM ONU, ONMB and ONM by Unitika, Ltd. As an example of a CVD silica vapor deposited stretched nylon film, there may be mentioned IB-ON by Dai Nippon Printing Co., Ltd. These films are particularly preferred because they can be inexpensively laminated by dry laminate methods, and can be produced without reducing the line speed.

<4> Layer Thickness

The seal layer (A) may have a layer thickness of 20 μm or less, and preferably 10 μm or less. At greater than 20 μm, the peel layer (cohesive peel layer) may become fouled, impairing the aesthetic quality of the peeling surface. The base material layer (B) preferably has a layer thickness of 20 μm-100 μm from the viewpoint of easy cuttability.

<5> Physical Properties

Factors influencing the physical properties required for a multilayer laminate film of the invention will now be explained.

(1) Cohesive Fracture Strength

The easy unsealability or cohesive fracture strength of the multilayer laminate film of the invention may be controlled by changing the blend ratio of the high-density polyethylene and polypropylene used in the seal layer (A).

(2) Gas Barrier Properties

In order to prevent loss of quality of contents (such as food), the multilayer laminate film of the invention may be further laminated with a packaging material exhibiting an oxygen and/or water vapor barrier property.

The multilayer laminate film of the invention, either alone or laminated with an appropriate packaging material, can exhibit, in terms of oxygen permeability, an excellent oxygen barrier property of 2.0 cc/m$^2$·day·atm or less as the numerical value obtained by the method according to JIS K 7126, and in terms of water vapor permeability, an excellent water vapor barrier property of 3.0 g/m$^2$·day or less as the numerical value obtained by the method according to JIS K 7129.

<6> Construction of the Multilayer Laminate Film

The construction of a multilayer laminate film of the invention will now be explained based on the example shown in FIG. 1. FIG. 1 shows a multilayer laminate film comprising a seal layer (A) and a base material layer (B) according to the invention, laminated with an adhesive layer, then laminated thereover with the base material for a packaging material composed of a stretched film or barrier film, further laminated thereover with an adhesive layer that has been printed if necessary, and still further laminated thereover with the base material of a packaging material composed of a stretched film or barrier film.

<7> Packaging Container

The multilayer laminate film of the invention may be used as a sealant film for the lid material of a packaging container. Specifically, the opening of a container formed of polypropylene is heat sealed in a superimposed state of contact with the seal layer (A), and at the time of opening the seal layer (A) undergoes cohesive peeling.

<8> Packaging Bag

The multilayer laminate film of the invention may also be suitably used as a packaging bag. A packaging bag comprising a multilayer laminate film of the invention has excellent easy unsealability and gas barrier properties.

(1) Bag Production

Such a packaging bag can be produced by folding a multilayer laminate film of the invention with the surfaces of the seal layer (A) facing each other, conforming the edges into the desired heat seal shape such as a side seal or flat seal shape, and heat sealing them to form various shapes. Alternatively, two multilayer laminate films of the invention may be superimposed by folding so that the surfaces of the seal layer (A) face the inside of the packaging bag, and the edges heat sealed to produce the bag. Or a first film composed of a multilayer laminate film of the invention may be laminated with another desired second film and a bag is produced in the same manner. This is because the multilayer laminate film of the invention can exhibit suitable adhesive strength even when heat sealed by superimposing it on a surface other than a seal layer, such as one composed of polypropylene alone, for example.

The second film may be one of the following types of multilayer laminate films, for example.

(i) A multilayer laminate film obtained by laminating a stretched film on the surface of a polypropylene film, and then laminating a barrier film thereover.

(ii) A multilayer laminate film obtained by laminating a barrier film on the surface of a polypropylene film, and then laminating a stretched film thereover.

(iii) A multilayer laminate film obtained by laminating a stretched film on the surface of a polypropylene film, then laminating an aluminum foil thereover, and further laminating a stretched film thereover.

(iv) A multilayer laminate film obtained by laminating an aluminum foil on the surface of a polypropylene film, and then laminating one layer or two or more layers of stretched films thereover.

In this case, the packaging bag may be produced by superimposing the seal layer (A) side of the first film, composed of a multilayer laminate film of the invention, onto and facing the polypropylene film side of the second film, and heat sealing the edges. The stretched film of the second film may be, for example, a polyethylene terephthalate film or stretched nylon film. The barrier film of the second film may be, for example, an alumina vapor deposition film, silica vapor deposition film or acrylic acid resin coating film.

The heat sealing may be carried out by a known method such as heat sealing or impulse sealing.

During the actual procedure, an insertion opening is left for insertion of contents while the rest of the periphery is heat sealed, to form a bag. The contents are then inserted and the insertion opening is closed by heat sealing. At the time of opening, the seal layer (A) undergoes cohesive fracture at the fused surface, thus producing an aesthetic open surface.

(2) Seal Shape at the Opening

The packaging bag of the invention may be provided with various types of openings, depending on the purpose. The MFR of the resin composing the seal layer (A) may be controlled according to the seal shape of the opening, in order to impart a suitable degree of easy unsealability.

FIG. 2 shows an embodiment of a packaging bag according to the invention. In FIG. 2, the opening is heat sealed in a coronoid shape protruding outward from the bag, with a flange provided around the periphery. When the packaging bag is opened, the tip of the coronoid section becomes the peel opening point, after which the peel site moves toward the skirt of the coronoid section. Heat sealing the opening in a coronoid shape rather than as a linear heat seal along the direction perpendicular to the direction of opening diffuses the force required for peeling. It is thus possible to obtain a packaging bag that can be opened more easily while maintaining sufficient sealing property.

A coronoid shape is an inverted V-shape consisting of two non-parallel straight lines or curves. By adjusting the seal width when the heat seal is formed along these two lines, it is possible to adjust the force required for opening. According to the invention, the sum of the seal widths as measured along the direction perpendicular to the direction of opening, at the sections other than the cross point of the two lines, is preferably 5-20 mm and more preferably 6-12 mm from the viewpoint of sealing property and easy unsealability.

According to the invention, double openings may be sealed as shown in FIG. 4. That is, the opening of the film may be heat sealed, and then an additional heat seal formed leaving an appropriate spacing between the heat sealed lines. This allows the sealing property of the packaging bag to be maintained even if it suffers slight tampering.

EXAMPLES

The present invention will now be explained in greater detail illustrating examples.

Example 1

(1) Seal Layer (A)

There were thoroughly kneaded 30 parts by weight of high-density polyethylene (HIZEX 3300F by Prime Polymer Co., Ltd., density=0.950 g/cm$^3$, MFR (190° C.)=1.1 g/10 min) and 70 parts by weight of ethylene/propylene random copolymer (NOVATEC FL02C by Japan Polypropylene Corp., density=0.9 g/cm$^3$, MFR (230° C.)=18 g/10 min), to prepare a resin composition for seal layer (A).

(2) Base Material Layer (B-1)

A resin composition for base material layer (B-1) was prepared comprising 100 parts by weight of high-density polyethylene (HIZEX 3300F by Prime Polymer Co., Ltd., density=0.950 g/cm$^3$, MFR (190° C.)=1.1 g/10 min).

(3) Base Material Layer (B-2)

A resin composition for base material layer (B-2) was prepared comprising 100 parts by weight of ethylene/butene copolymer copolymerized using a multisite catalyst (NEOZEX 3510F by Prime Polymer Co., Ltd., density=0.933 g/cm$^3$, MFR (190° C.)=1.6 g/10 min).

A top-blown air-cooled inflation co-extrusion film-forming machine was used to produce a multilayer laminate film with a total thickness of 50 μm (5 μm seal layer (A)/20 μm base material layer (B-1)/25 μm base material layer (B-2)).

Example 2

(1) Seal Layer (A)

There were thoroughly kneaded 30 parts by weight of high-density polyethylene (NOVATEC HJ360 by Japan Polyethylene Corp., density=0.951 g/cm$^3$, MFR (190° C.)=5.5 g/10 min) and 70 parts by weight of ethylene/propylene random copolymer (NOVATEC FL02C by Japan Polypropylene Corp., density=0.9 g/cm$^3$, MFR (230° C.)=18 g/10 min), to prepare a resin composition for seal layer (A).

(2) Base Material Layer (B)

A resin composition for base material layer (B) was prepared comprising 100 parts by weight of high-density polyethylene (NOVATEC HJ360 by Japan Polyethylene Corp., density=0.951 g/cm$^3$, MFR (190° C.)=5.5 g/10 min).

A top-blown air-cooled inflation co-extrusion film-forming machine was used to produce a multilayer laminate film with a total thickness of 50 μm (5 μm seal layer (A)/45 μm base material layer (B)).

Example 3

(1) Seal Layer (A)

There were thoroughly kneaded 40 parts by weight of high-density polyethylene (NOVATEC HJ362N by Japan Polyethylene Corp., density=0.953 g/cm$^3$, MFR (190° C.)=5.0 g/10 min) and 60 parts by weight of ethylene/propylene random copolymer (NOVATEC FL03A by Japan Polypropylene Corp., density=0.9 g/cm³, MFR (230° C.)=20 g/10 min), to prepare a resin composition for seal layer (A).

(2) Base Material Layer (B)

A resin composition for base material layer (B) was prepared comprising 100 parts by weight of high-density polyethylene (NOVATEC HJ362N by Japan Polyethylene. Corp., density=0.953 g/cm³, MFR (190° C.)=5.5 g/10 min).

A top-blown air-cooled inflation co-extrusion film-forming machine was used to produce a multilayer laminate film with a total thickness of 50 μm (5 μm seal layer (A)/45 μm base material layer (B)).

Example 4

(1) Seal Layer (A)

There were thoroughly kneaded 30 parts by weight of high-density polyethylene (HIZEX 3300F by Prime Polymer Co., Ltd., density=0.950 g/cm³, MFR (190° C.)=1.1 g/10 min) and 70 parts by weight of ethylene/propylene random copolymer (J235T by Prime Polymer Co., Ltd., density=0.90 g/cm³, MFR (230° C.)=15 g/10 min), to prepare a resin composition for seal layer (A).

(2) Base Material Layer (B-1)

A resin composition for base material layer (B-1) was prepared comprising 100 parts by weight of high-density polyethylene (HIZEX 3300F by Prime Polymer Co., Ltd., density=0.950 g/cm³, MFR (190° C.)=1.1 g/10 min).

(3) Base Material Layer (B-2)

A resin composition for base material layer (B-2) was prepared comprising 100 parts by weight of ethylene/butene copolymer copolymerized using a multisite catalyst (NEOZEX 3510F by Prime Polymer Co., Ltd., density=0.933 g/cm³, MFR (190° C.)=1.6 g/10 min).

A top-blown air-cooled inflation co-extrusion film-forming machine was used to produce a multilayer laminate film with a total thickness of 50 μm (5 μm seal layer (A)/20 μm base material layer (B-1)/25 μm base material layer (B-2)).

Example 5

(1) Seal Layer (A)

There were thoroughly kneaded 30 parts by weight of high-density polyethylene (HIZEX 3300F by Prime Polymer Co., Ltd., density=0.950 g/cm³, MFR (190° C.)=1.1 g/10 min) and 70 parts by weight of ethylene/propylene random copolymer (NOVATEC FL02C by Japan Polypropylene Corp., density=0.9 g/cm³, MFR (230° C.)=18 g/10 min), to prepare a resin composition for seal layer (A).

(2) Base Material Layer (B)

A resin composition for base material layer (B) was prepared comprising 100 parts by weight of an ethylene/propylene block copolymer (PF380A by SunAllomer, Ltd., density=0.90 g/cm³, MFR (190° C.)=1.0 g/10 min).

A top-blown air-cooled inflation co-extrusion film-forming machine was used to produce a multilayer laminate film with a total thickness of 50 μm (10 μm seal layer (A)/40 μm base material layer (B)).

Example 6

(1) Seal Layer (A)

There were thoroughly kneaded 30 parts by weight of high-density polyethylene (NOVATEC HJ360 by Japan Polyethylene Corp., density=0.951 g/cm³, MFR (190° C.)=5.5 g/10 min) and 70 parts by weight of ethylene/propylene random copolymer (NOVATEC FL02C by Japan Polypropylene Corp., density=0.9 g/cm³, MFR (230° C.)=18 g/10 min), to prepare a resin composition for seal layer (A).

(2) Base Material Layer (B)

A resin composition for base material layer (B) was prepared comprising 100 parts by weight of an ethylene/propylene block copolymer (FW4BT by Japan Polypropylene Corp., density=0.90 g/cm³, MFR (230° C.)=6.5 g/10 min).

A top-blown air-cooled inflation co-extrusion film-forming machine was used to produce a multilayer laminate film with a total thickness of 50 μm (5 μm seal layer (A)/45 μm base material layer (B)).

Example 7

(1) Seal Layer (A)

There were thoroughly kneaded 40 parts by weight of high-density polyethylene (NOVATEC HJ362N by Japan Polyethylene. Corp., density=0.953 g/cm³, MFR (190° C.)=5.0 g/10 min) and 60 parts by weight of ethylene/propylene random copolymer (NOVATEC FL03A by Japan Polypropylene Corp., density=0.9 g/cm³, MFR (230° C.)=20 g/10 min), to prepare a resin composition for seal layer (A).

(2) Base Material Layer (B)

A resin composition for base material layer (B) was prepared comprising 100 parts by weight of an ethylene/propylene block copolymer (PC540R by SunAllomer, Ltd., density=0.90 g/cm³, MFR (230° C.)=5.0 g/10 min).

A top-blown air-cooled inflation co-extrusion film-forming machine was used to produce a multilayer laminate film with a total thickness of 50 μm (5 μm seal layer (A)/45 μm base material layer (B)).

Example 8

(1) Seal Layer (A)

There were thoroughly kneaded 30 parts by weight of high-density polyethylene (HIZEX 3300F by Prime Polymer Co., Ltd., density=0.950 g/cm³, MFR (190° C.)=1.1 g/10 min) and 70 parts by weight of ethylene/propylene random copolymer (J235T by Prime Polymer Co., Ltd., density=0.90 g/cm³, MFR (230° C.) 15 g/10 min), to prepare a resin composition for seal layer (A).

(2) Base Material Layer (B)

A resin composition for base material layer (B) was prepared comprising 100 parts by weight of an ethylene/propylene block copolymer (FX4E by SunAllomer, Ltd., density=0.90 g/cm$^3$, MFR (230° C.)=5.3 g/10 min).

A top-blown air-cooled inflation co-extrusion film-forming machine was used to produce a multilayer laminate film with a total thickness of 50 μm (5 μm seal layer (A)/45 μm base material layer (B)).

Example 9

The base material layer (B-2) surface on the side opposite the seal layer (A) of the multilayer laminate film produced in Example 1 was subjected to corona treatment, and this surface was coated with a two-part curable urethane adhesive (base compound: polyester polyol, curing agent: aliphatic isocyanate), a stretched nylon film (IB-ON-UB by Dai Nippon Printing Co., Ltd., single-side corona treated, 15 μm thickness) was laminated thereover, and then a CVD silica vapor deposited stretched nylon film (biaxial stretched nylon film by Unitika, Ltd. [EMBLEM NX], double-side corona treated, 15 μm thickness) was laminated thereover. The obtained multilayer laminate film had the following structure: seal layer (A)/base material layer (B-1)/base material layer (B-2)/DL/stretched nylon film layer/DL/CVD silica vapor deposited stretched nylon film layer (where DL represents the adhesive section).

Examples 10-12

The multilayer laminate films produced in Examples 2-4 were each used for lamination of a packaging material in the same manner as Example 9.

Example 13

The base material layer (B-2) surface on the side opposite the seal layer (A) of the multilayer laminate film produced in Example 1 was subjected to corona treatment, and this surface was coated with a two-part curable urethane adhesive (base compound: polyester polyol, curing agent: aliphatic isocyanate), a stretched nylon film (biaxial stretched nylon film by Unitika, Ltd. [EMBLEM NX], double-side corona treated, 15 μm thickness) was laminated thereover, and then a CVD silica vapor deposited stretched polyethylene terephthalate (PET) film (IB-PET-RB by Dai Nippon Printing Co., Ltd., single-side corona treated, 12 μm thickness) was laminated thereover. The obtained multilayer laminate film had the following structure: seal layer (A)/base material layer (B-1)/base material layer (B-2)/DL/stretched nylon film layer/DL/CVD silica vapor deposited stretched PET film layer.

Example 14

The base material layer (B) surface on the side opposite the seal layer (A) of the multilayer laminate film produced in Example 2 was subjected to corona treatment, and this surface was coated with a two-part curable urethane adhesive (base compound: polyester polyol, curing agent: aliphatic isocyanate), a stretched nylon film (biaxial stretched nylon film by Unitika, Ltd. [EMBLEM NX], double-side corona treated, 15 μm thickness) was laminated thereover, and then an acrylic acid resin coating film (BESELA ET-R by Kureha Corp., single-side corona treated, 13 μm thickness) was laminated thereover. The obtained multilayer laminate film had the following structure: seal layer (A)/base material layer (B)/DL/stretched nylon film layer/DL/BESELA ET-R.

Example 15

The base material layer (B) surface on the side opposite the seal layer (A) of the multilayer laminate film produced in Example 3 was subjected to corona treatment, and this surface was coated with a two-part curable urethane adhesive (base compound: polyester polyol, curing agent: aliphatic isocyanate), after which a CVD silica vapor deposited stretched nylon film (IB-ON by Dai Nippon Printing Co., Ltd., double-side corona treated, 15 μm thickness) was laminated thereover, and then BESELA ET-R (single-side corona treated, 13 μm thickness) was laminated thereover. The obtained multilayer laminate film had the following structure: seal layer (A)/base material layer (B)/DL/stretched nylon film layer/DL/BESELA ET-R.

Example 16

The multilayer laminate film produced in Example 4 was used for lamination of a packaging material in the same manner as Example 13.

Example 17

The base material layer (B) surface on the side opposite the seal layer (A) of the multilayer laminate film produced in Example 5 was subjected to corona treatment, and this surface was coated with a two-part curable urethane adhesive (base compound: polyester polyol, curing agent: aliphatic isocyanate), a CVD silica vapor deposited stretched nylon film (IB-ON-UB by Dai Nippon Printing Co., Ltd., single-side corona treated, 15 μm thickness) was laminated thereover, and then a biaxial stretched nylon film (biaxial stretched nylon film by Unitika, Ltd. [EMBLEM NX], double-sided corona treated, 15 μm thickness) was laminated thereover. The obtained multilayer laminate film had the following structure: seal layer (A)/base material layer (B)/DL/CVD silica vapor deposited stretched nylon film layer/DL/biaxial stretched nylon film layer.

Examples 18-20

The multilayer laminate films produced in Examples 6-8 were each used for lamination of a packaging material in the same manner as Example 17.

Example 21

The base material layer (B) surface on the side opposite the seal layer (A) of the multilayer laminate film produced in Example 5 was subjected to corona treatment, and this surface was coated with a two-part curable urethane adhesive (base compound: polyester polyol, curing agent: aliphatic isocyanate), a stretched nylon film (biaxial stretched nylon film [EMBLEM NX] by Unitika, Ltd., double-side corona treated, 15 μm thickness) was laminated thereover, and then a CVD silica vapor deposited stretched PET film (IB-PET-RB, product of Dai Nippon Printing Co., Ltd., single-side corona treated, 12 μm thickness) was laminated thereover. The obtained multilayer laminate film had the following structure: seal layer (A)/base material layer (B)/DL/stretched nylon film layer/DL/CVD silica vapor deposited stretched PET film layer.

Example 22

The base material layer (B) surface on the side opposite the seal layer (A) of the multilayer laminate film produced in Example 6 was subjected to corona treatment, and this surface was coated with a two-part curable urethane adhesive (base compound: polyester polyol, curing agent: aliphatic isocyanate), a stretched nylon film (biaxial stretched nylon film by Unitika, Ltd. [EMBLEM NX], double-side corona treated, 15 μm thickness) was laminated thereover, and then an acrylic acid resin coating film (BESELA ET-R by Kureha Corp., single-side corona treated, 13 μm thickness) was laminated thereover. The obtained multilayer laminate film had the following structure: seal layer (A)/base material layer (B)/DL/stretched nylon film layer/DL/stretched nylon film layer/DL/BESELA ET-R.

Example 23

The base material layer (B) surface on the side opposite the seal layer (A) of the multilayer laminate film produced in Example 7 was subjected to corona treatment, and this surface was coated with a two-part curable urethane adhesive (base compound: polyester polyol, curing agent: aliphatic isocyanate), a CVD silica vapor deposited stretched nylon film (IB-ON by Dai Nippon Printing Co., Ltd., double-side corona treated, 15 μm thickness) was laminated thereover, and then BESELA ET-R (single-side corona treated, 13 μm thickness) was laminated thereover. The obtained multilayer laminate film had the following structure: seal layer (A)/base material layer (B)/DL/stretched nylon film layer/DL/stretched nylon film layer/DL/BESELA ET-R.

Example 24

The multilayer laminate film produced in Example 8 was used for lamination of a packaging material in the same manner as Example 21.

Examples 25A-28A

Each of the multilayer laminate films produced in Examples 9-12 was used as the lid material for a polypropylene cup-shaped container (749 diameter, 5 mm flange width, 120 cc volume), and heat sealing was carried out from a flat seal under conditions with 190° C. seal temperature, 3 kg/cm$^2$, 1 second, to produce a water-filled cup sample. It was then subjected to retort treatment in a retort oven at 121° C. for 30 minutes. After the retort treatment, it was kept at ordinary temperature for 24 hours the outer appearance was observed, and the seal strength and the oxygen permeability and water vapor permeability of the lid material were measured. No sagging of the lid material was observed even after retort treatment. Also, high oxygen barrier and water vapor barrier properties, as well as suitable seal strength, were exhibited.

Examples 25B-28B

Lid material samples for cup-shaped containers were fabricated in the same manner as Examples 25A-28A from the multilayer laminate films produced in Examples 17-20. The same treatment was also carried out and the seal strength, etc. was evaluated.

Example 29A

Two multilayer laminate films produced in the manner of Example 13 were superimposed with their seal layer (A) sides facing each other, and the edges were heat sealed under conditions with 190° C. seal temperature, 1 kg/cm$^2$, 1 second, to fabricate a packaging bag having the opening heat sealed in a coronoid shape and a packaging bag heat sealed in a double coronoid shape. A 180 cc portion of water was filled into the interior of the single-folded heat sealed packaging bag and was subjected to retort treatment with a retort oven at 121° C. for 30 minutes. After the retort treatment, it was kept at ordinary temperature for 24 hours, the outer appearance was observed, and the seal strength and the oxygen permeability and water vapor permeability of the packaging bag were measured. No leakage of water was observed in the packaging bag after retort treatment. Also, high oxygen barrier and water vapor barrier properties, as well as suitable seal strength (strength of the opening), were exhibited.

Example 29B

A packaging bag heat sealed into a coronoid shape was formed in the same manner as Example 29A from two multilayer laminate films produced in Example 21. The same treatment was also carried out and the seal strength, etc. was evaluated.

Example 30A

Two multilayer laminate films produced in Example 14 were superimposed with their seal layer (A) sides facing each other, and the edges were heat sealed under conditions with 190° C. seal temperature, 1 kg/cm$^2$, 1 second, to fabricate a packaging bag having the opening heat sealed in a coronoid shape and a packaging bag heat sealed in a double coronoid shape. Commercially available sausage (50 g) was filled into the interior of the single-folded heat sealed packaging bag and was subjected to retort treatment with a retort oven at 121° C. for 30 minutes. After the retort treatment, it was kept at ordinary temperature for 24 hours, the outer appearance was observed, and the seal strength and the oxygen permeability and water vapor permeability of the packaging bag were measured. No leakage of contents was observed in the packaging bag after retort treatment. Also, high oxygen barrier and water vapor barrier properties, as well as suitable seal strength (strength of the opening), were exhibited.

Example 30B

A packaging bag heat sealed into a coronoid shape was formed in the same manner as Example 30A from two multilayer laminate films produced in Example 22. The same treatment was also carried out and the seal strength, etc. was evaluated.

Example 31A

A packaging bag was produced from a multilayer laminate film according to Example 15 (first film) and a second film produced in the following manner.
a) Production of Second Film
(1) Layer (X)
A resin composition for layer (X) was prepared by thoroughly kneading 100 parts by weight of an ethylene/propylene block copolymer (BC6CB by Japan Polypropylene Corp., density=0.9 g/cm$^3$, MFR (230° C.)=2.5 g/10 min).
(2) Layer (Y)
A resin composition for layer (Y) was prepared by thoroughly kneading 100 parts by weight of an ethylene/propylene block copolymer (PF380A by SunAllomer, Ltd., density=0.9 g/cm$^3$, MFR (230° C.)=1.1 g/10 min).

A top-blown air-cooled inflation co-extrusion film-forming machine was used to produce a multilayer laminate film with a total thickness of 50 μm (5 μm layer (X)/45 μm layer (Y)).

The layer (Y) surface on the side opposite the seal layer (X) was subjected to corona treatment, and this surface was coated with a two-part curable urethane adhesive (base compound: polyester polyol, curing agent: aliphatic isocyanate), a stretched nylon film (biaxial stretched nylon film [EMBLEM NX] by Unitika, Ltd., double-side corona treated, 15 μm thickness) was laminated thereover, and then an aluminum foil (product of Toyo Aluminium, K.K., 7 μm thickness) and a stretched PET film (T4102 by Toyobo, Ltd., single-side corona treated, 12 μm thickness) were laminated thereover. The obtained multilayer laminate film had the following structure: layer (X)/layer (Y)/DL/stretched nylon film layer/ DL/aluminum foil/DL/stretched PET film layer.

b) Production of Packaging Bags

A multilayer laminate film produced in Example 15 was used as a first film with its seal layer (A) side superimposed facing the layer (X) side of the second film, and the edges were heat sealed under conditions with 190° C. seal temperature, 1 kg/cm², 1 second, to fabricate a packaging bag having the opening heat sealed in a coronoid shape and a packaging bag heat sealed in a double coronoid shape. Of these two, commercially available sausage (50 g) was filled into the interior of the single-folded heat sealed packaging bag and was subjected to retort treatment with a retort oven at 121° C. for 30 minutes. After the retort treatment, it was kept at ordinary temperature for 24 hours, the outer appearance was observed, and the seal strength as well as the oxygen permeability and water vapor permeability of the first film of the packaging bag (Example 15) were measured. No leakage of contents was observed in the packaging bag after retort treatment. Also, the first film (Example 15) exhibited high oxygen barrier and water vapor barrier properties, as well as suitable seal strength (strength of the opening).

Example 31B

A packaging bag was produced from a multilayer laminate film according to Example 23 (first film) and a second film produced in the same manner as Example 31A above. The same treatment was also carried out and the seal strength, etc. was evaluated.

Example 32A

A multilayer laminate film according to Example 16 was used as the first film, and the same results were obtained in the same manner as Example 31A.

Example 32B

A multilayer laminate film according to Example 24 was used as the first film, and the same results were obtained in the same manner as Example 31A.

[Results]

The seal strengths, oxygen permeabilities and water vapor permeabilities measured for Examples 25A-32A are shown in Table 1. Also, the seal strengths, oxygen permeabilities and water vapor permeabilities measured for Examples 25B-32B are shown in Table 2.

The physical properties were measured in the following manner.

(1) Layer thickness: This was measured using a p-Meter by Sony Corp.
(2) Oxygen permeability: This was measured using an OXTRAN 2/20 instrument by MOCON, U.S.A., under conditions with a temperature of 23° C. and a humidity of 90% RH.
(3) Water vapor permeability: This was measured using a PERMATRAN instrument by MOCON, U.S.A., under conditions with a temperature of 40° C. and a humidity of 90% RH.
(4) Seal strengths of lid materials of Examples 25A-28A and 25B-28B: A polypropylene cup was sealed from a flat seal under conditions of 190° C. seal temperature, kg/cm², 1 second. A 15 mm-wide test strip was cut out with the tensile tester and used for a tensile test at 300 mm/min.
(5) Seal strengths of packaging bags of Examples 29A-32A and 29B-32B: A 15 mm-wide test strip was cut from the heat seal section of the packaging bag and used for a tensile test at 300 mm/min.

TABLE 1

| | Seal strength (N/15 mm) | Oxygen permeability (cc/m² · day · atm) | Water vapor permeability (g/m² · day · atm) |
|---|---|---|---|
| Example 25A | 14.6 | 0.7 | 2.3 |
| Example 26A | 15.3 | 0.6 | 1.8 |
| Example 27A | 16.2 | 0.6 | 2.1 |
| Example 28A | 18.6 | 0.9 | 2.3 |
| Example 29A | 5.2 | 0.7 | 2.3 |
| Example 30A | 4.6 | 0.5 | 3.3 |
| Example 31A | 6.5 | 0.4 | 1.3 |
| Example 32A | 7.5 | 0.6 | 3.4 |

TABLE 2

| | Seal strength (N/15 mm) | Oxygen permeability (cc/m² · day · atm) | Water vapor permeability (g/m² · day · atm) |
|---|---|---|---|
| Example 25B | 17.9 | 0.7 | 1.7 |
| Example 26B | 18.4 | 0.6 | 2.3 |
| Example 27B | 18.2 | 0.5 | 2.4 |
| Example 28B | 18.8 | 0.7 | 2.1 |
| Example 29B | 5.2 | 0.9 | 2.1 |
| Example 30B | 4.6 | 1.1 | 2.3 |
| Example 31B | 6.5 | 0.9 | 1.8 |
| Example 32B | 7.5 | 0.8 | 1.8 |

The lid materials and packaging bags of Examples 25A-32A and Examples 25B-32B all exhibited satisfactory seal strength and excellent easy unsealability. They also all exhibited very low oxygen permeability and water vapor permeability, and therefore had excellent gas barrier properties.

Figure 1:
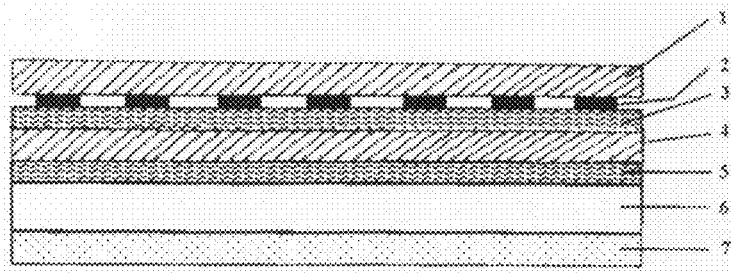
FIG. 1 is a cross-sectional view showing the layer construction, of a lid material (multilayer laminate film+packaging material) employing a multilayer laminate film according to the invention. In this drawing, the symbol 1 represents the base material of a packaging material, 2 represents a printed layer (as needed), 3 represents a laminated adhesive layer, 4 represents the base material of a packaging material, 5 represents a laminated adhesive layer, 6 represents a base material layer (B) and 7 represents a seal layer (A).
Figure 2:
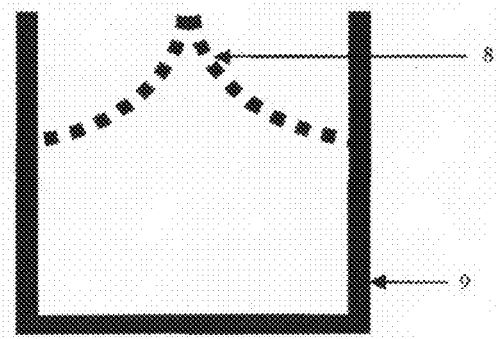
FIG. 2 shows an embodiment of a packaging bag employing a multilayer laminate film according to the invention. In the drawing, the symbol 8 represents a coronoid heat seal section (opening) and 9 represents a multilayer laminate film heat seal section.
Figure 3:
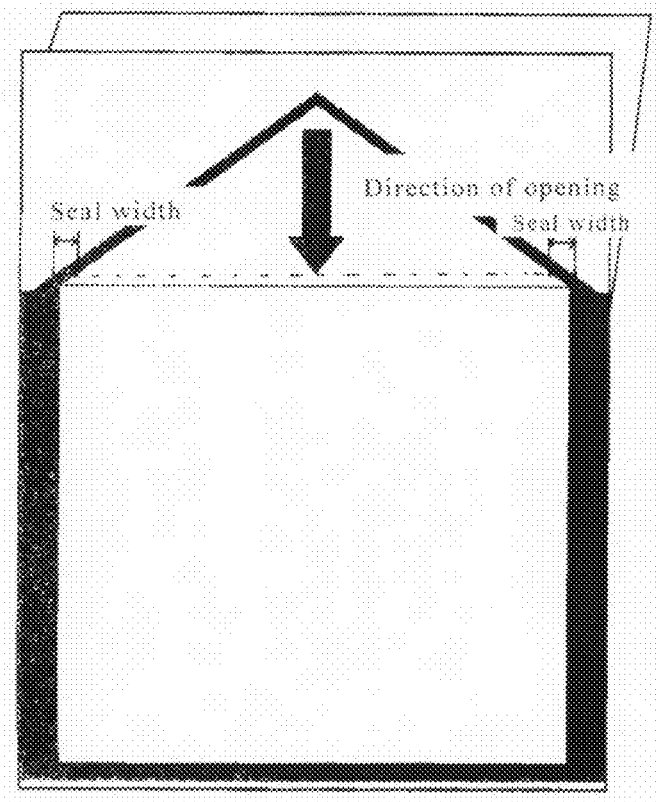
FIG. 3 shows an embodiment of a packaging bag employing a multilayer laminate film according to the invention.
Figure 4:
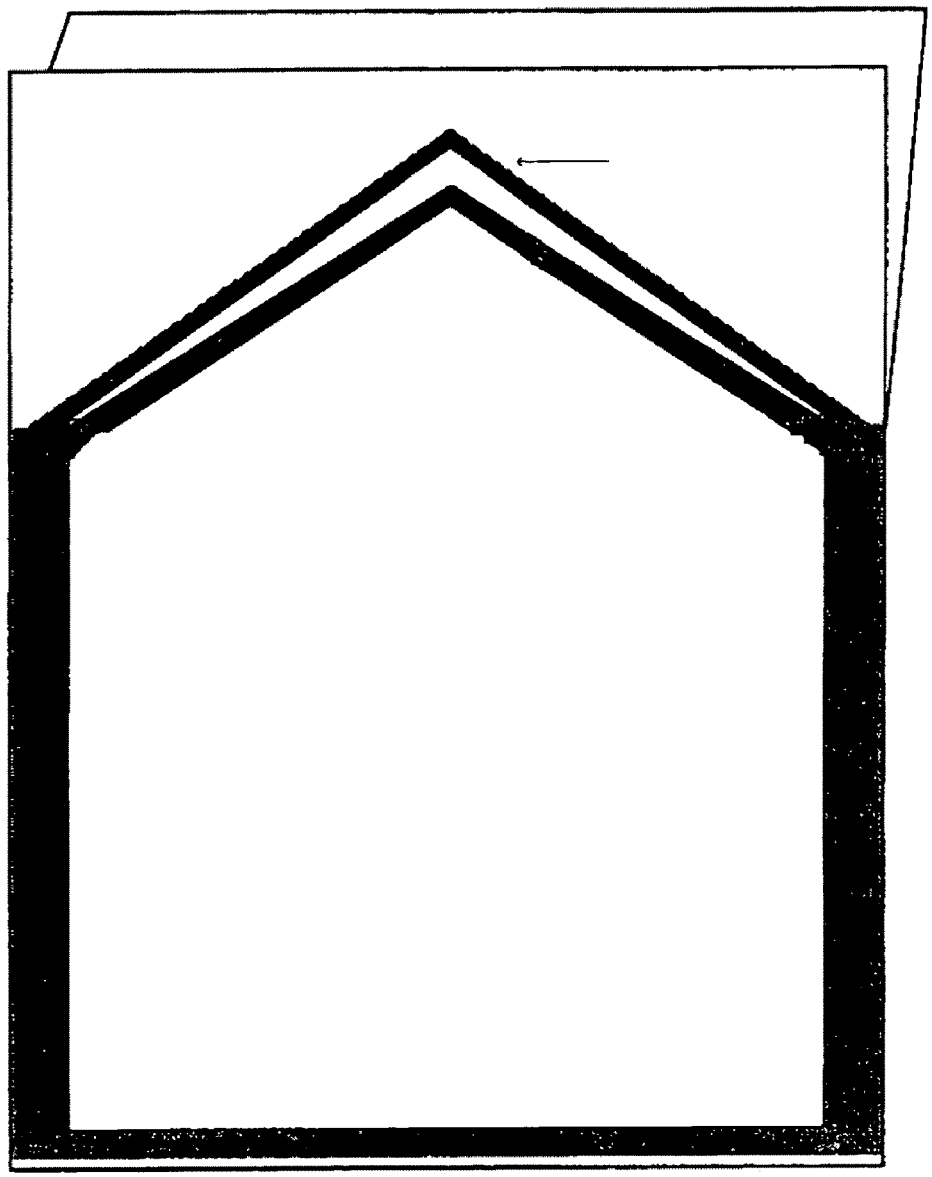
FIG. 4 shows an embodiment of a packaging bag employing a multilayer laminate film according to the invention. In these drawings, the arrows indicate double seals.

The invention claimed is:

1. A multilayer laminate film comprising a seal layer (A) and a base material layer (B), wherein:
   the seal layer (A) comprises a mixture of 10-50 parts by weight of high-density polyethylene and 50-90 parts by weight of polypropylene;
   the base material layer (B) comprises one member selected from the group consisting of (a) an ethylene/butene copolymer with a density of 0.93 g/cm$^3$-0.94 g/cm$^3$, polymerized using a multisite catalyst, (b) high-density polyethylene with a density of 0.945 g/cm$^3$-0.965 g/cm$^3$ and (c) an ethylene/propylene block or random copolymer, wherein each of said ethylene/butene copolymer, said high-density polyethylene and said ethylene/propylene block or random copolymer has a flexural modulus of 300 MPa or greater as a numerical value obtained by the method according to JIS K 7171;
   the base material layer (B) is laminated on the seal layer (A) in one or more layers; and
   the layer thickness of the seal layer (A) is 1 μm-20 μm while the layer thickness of the base material layer (B) is 20 μm-100 μm.

2. The multilayer laminate film according to claim 1, wherein the base material layer (B) comprises (a) an ethylene/butene copolymer with a density of 0.93 g/cm$^3$-0.94 g/cm$^3$, polymerized using a multisite catalyst, or (b) high-density polyethylene with a density of 0.945 g/cm$^3$-0.965 g/cm$^3$.

3. The multilayer laminate film according to claim 1, wherein the base material layer (B) comprises (c) an ethylene/propylene block or random copolymer.

4. The multilayer laminate film according to claim 1, wherein the polypropylene in the seal layer (A) is an ethylene/propylene random copolymer.

5. The multilayer laminate film according to claim 1, wherein the MFR (190° C.) of the high-density polyethylene in the seal layer (A) is 1-7 g/10 min.

6. The multilayer laminate film according to claim 1, wherein the MFR (230° C.) of the polypropylene in the seal layer (A) is 5-30 g/10 min.

7. The multilayer laminate film according to claim 1, further comprising a packaging material selected from among a stretched film, a barrier film and aluminum foil, wherein the packaging material is laminated, in one or more layers, on the outer surface of the base material layer (B) opposite the seal layer (A) side.

8. The multilayer laminate film according to claim 7, wherein a stretched film is laminated on the outer surface of the base material layer (B) opposite the seal layer (A) side, and then a barrier film is laminated thereover.

9. The multilayer laminate film according to claim 7, wherein a barrier film is laminated on the outer surface of the base material layer (B) opposite the seal layer (A) side, and then a stretched film is laminated thereover.

10. The multilayer laminate film according to claim 7, wherein a stretched film is laminated on the outer surface of the base material layer (B) opposite the seal layer (A) side, and then an aluminum foil and a stretched film are laminated thereover.

11. The multilayer laminate film according to claim 7, wherein an aluminum foil is laminated on the outer surface of the base material layer (B) opposite the seal layer (A) side, and then a stretched film is laminated, in one or more layers, thereover.

12. The multilayer laminate film according to claim 7, wherein the stretched film is a polyethylene terephthalate film or a stretched nylon film.

13. The multilayer laminate film according to claim 7, wherein the barrier film is selected from among an alumina vapor deposition film, a silica vapor deposition film and an acrylic acid resin coating film.

14. A multilayer laminate film, comprising a seal layer (A), a base material layer (B), and a packaging material, wherein:
   the seal layer (A) comprises a mixture of 10-50 parts by weight of high-density polyethylene and 50-90 parts by weight of polypropylene;
   the base material layer (B) comprises one member selected from the group consisting of (a) an ethylene/butene copolymer with a density of 0.93 g/cm$^3$-0.94g/cm$^3$, polymerized using a multisite catalyst, (b) high-density polyethylene with a density of 0.945 g/cm$^3$-0.965 g/cm$^3$ and (c) an ethylene/propylene block or random copolymer, wherein each of said ethylene/butene copolymer, said high-density polyethylene and said ethylene/propylene block or random copolymer has a flexural modulus of 300 MPa or greater as a numerical value obtained by the method according to JIS K 7171;
   the packaging material is selected from among a stretched film, a barrier film and aluminum foil;
   the base material layer (B) is laminated on the seal layer (A) in one or more layers, and the packaging material is laminated, in one or more layers, on the outer surface of the base material layer (B) opposite the seal layer (A) side;
   the layer thickness of the seal layer (A) is 1 μm-20 μm while the layer thickness of the base material layer (B) is 20 μm-100 μm;
   the oxygen permeability is 2.0 cc/m$^2$·day·atm or less as the numerical value obtained by the method according to JIS K 7126; and
   the water vapor permeability is 3.0 g/m$^2$·day or less as the numerical value obtained by the method according to JIS K 7129.

15. The multilayer laminate film according to claim 14, wherein the multilayer laminate film is for retort use.

16. A packaging polypropylene container comprising the multilayer laminate film according to claim 7 as a lid material, wherein the seal layer (A) of the lid material is heat sealed in a superimposed state of contact with the opening of the polypropylene container, and during opening, the seal layer (A) of the lid material is cohesion-peeled.

17. A packaging bag comprising the multilayer laminate film according to claim 7, wherein the multilayer laminate film is folded so that the surfaces of the seal layer (A) face each other, and the edges are heat sealed.

18. A packaging bag comprising two multilayer laminate films according to claim 7, wherein the two multilayer laminate films are superimposed so that the surfaces of their seal layers (A) face each other, and the edges are heat sealed.

19. A packaging bag comprising a first film and a second film,
wherein:
the first film is composed of the multilayer laminate film according to claim 7, and
the second film is selected from:
(i) a multilayer laminate film obtained by laminating a stretched film onto the surface of a polypropylene film and then laminating a barrier film thereover;
(ii) a multilayer laminate film obtained by laminating a barrier film onto the surface of a polypropylene film and then laminating a stretched film thereover;
(iii) a multilayer laminate film obtained by laminating a stretched film onto the surface of a polypropylene film, then laminating an aluminum foil thereover, and further laminating a stretched film thereover; and
(iv) a multilayer laminate film obtained by laminating an aluminum foil onto the surface of a polypropylene film and then laminating one or more layers of stretched films thereover,
wherein the first film is superimposed on the second film in such a manner that the surface of the seal layer (A) of the first film faces the surface of the polypropylene film of the second film, and the edges are heat sealed.

20. The packaging bag according to claim 19, wherein the stretched film of the second film is a polyethylene terephthalate film or a stretched nylon film, and the barrier film of the second film is selected from among an alumina vapor deposition film, silica vapor deposition film and acrylic acid resin coating film.

21. A multilayer laminate film comprising a seal layer (A) and a base material layer (B), wherein:
the seal layer (A) comprises a mixture of 10-50 parts by weight of high-density polyethylene and 50-90 parts by weight of polypropylene;
the base material layer (B) comprises one member selected from the group consisting of (a) an ethylene/butene copolymer with a density of 0.93 $g/cm^3$-0.94 $g/cm^3$, polymerized using a multisite catalyst, (b) high-density polyethylene with a density of 0.945 $g/cm^3$-0.965 $g/cm^3$ and (c) an ethylene/propylene block or random copolymer, wherein each of said ethylene/butene copolymer, said high-density polyethylene and said ethylene/propylene block or random copolymer has a flexural modulus of 300 MPa or greater as a numerical value obtained by the method according to JIS K 7171;
the base material layer (B) is laminated on the seal layer (A) in one or more layers;
the layer thickness of the seal layer (A) is 1 μm-20 μm while the layer thickness of the base material layer (B) is 20 μm-100 μm,
the oxygen permeability is 2.0 $cc/m^2 \cdot day \cdot atm$ or less as the numerical value obtained by the method according to JIS K 7126, and
the water vapor permeability is 3.0 $g/m^2 \cdot day$ or less as the numerical value obtained by the method according to JIS K 7129.

\* \* \* \* \*